(12) United States Patent
Hathaway et al.

(10) Patent No.: US 11,002,191 B2
(45) Date of Patent: May 11, 2021

(54) ELECTRIC MACHINE WITH NON-CONTACT INTERFACE

(71) Applicant: GE AVIATION SYSTEMS LLC, Grand Rapids, MI (US)

(72) Inventors: Samuel Robert Hathaway, Cincinnati, OH (US); Clifford D. Westerlund, Rockford, IL (US); Jason D. Wilkening, South Beloit, IL (US); Robert D. Grennan, Byron, IL (US); David George Kloos, Dayton, OH (US); John S. Mears, Cincinnati, OH (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 59 days.

(21) Appl. No.: 16/240,245

(22) Filed: Jan. 4, 2019

(65) Prior Publication Data

US 2020/0217250 A1 Jul. 9, 2020

(51) Int. Cl.
*F16L 27/00* (2006.01)
*F02C 7/18* (2006.01)
*F01D 5/08* (2006.01)
*H02K 1/32* (2006.01)
*H02K 9/19* (2006.01)
(Continued)

(52) U.S. Cl.
CPC ..................... *F02C 7/18* (2013.01); *F01L 5/08* (2013.01); *F02C 3/085* (2013.01); *F16L 27/00* (2013.01)

(58) Field of Classification Search
CPC .......... H02K 1/32; H02K 7/1832; H02K 9/19; H02K 9/193; F01D 5/08; F01D 25/12; F02C 7/32; B05B 15/65; B64D 27/10; B64D 33/08

USPC ...................... 310/54, 61; 285/332
See application file for complete search history.

(56) References Cited

U.S. PATENT DOCUMENTS 3,067,777 A * 12/1962 Briscoe ................ F16L 27/082
138/44
3,129,960 A * 4/1964 Schrodt ................... F16D 25/12
285/95
(Continued)

FOREIGN PATENT DOCUMENTS

DE 001166922 * 4/1964 ............... H02K 9/19
GB 191126756 A * 4/1912
(Continued)

OTHER PUBLICATIONS

European Patent Office, Extended Search Report re Corresponding Application No. 19219183.1-1004, dated May 18, 2020, 10 pages, Munich, Germany.
(Continued)

*Primary Examiner* — Burton S Mullins
(74) *Attorney, Agent, or Firm* — McGarry Bair PC (57) ABSTRACT

An apparatus and method for a generator for generating power having a rotary union between a rotor and a stator, the rotary union comprising a first fluid passage having a converging nozzle and located within the stator having a first inlet and a first outlet, a second fluid passage having a diverging nozzle and located within the rotor and having a second inlet and a second outlet, the second inlet is aligned with the first outlet and at least one gap located between the rotor and stator.

24 Claims, 8 Drawing Sheets

(51) Int. Cl.
*F01L 5/08* (2006.01)
*F02C 3/08* (2006.01)

(56) References Cited

U.S. PATENT DOCUMENTS

| | | | | |
|---|---|---|---|---|
| 3,648,085 | A * | 3/1972 | Fujii | H02K 9/19 |
| | | | | 310/54 |
| 3,733,503 | A * | 5/1973 | Potter | H02K 9/19 |
| | | | | 310/68 D |
| 4,621,210 | A * | 11/1986 | Krinickas, Jr. | H02K 11/042 |
| | | | | 310/54 |
| 4,669,760 | A * | 6/1987 | Hashish | F16L 27/0832 |
| | | | | 285/272 |
| 5,149,141 | A * | 9/1992 | Newhouse | H02K 9/193 |
| | | | | 285/13 |
| 5,203,592 | A * | 4/1993 | Takada | F16L 27/0828 |
| | | | | 285/14 |
| 6,434,943 | B1 | 8/2002 | Garris | |
| 6,707,180 | B2 * | 3/2004 | Hattori | H02K 1/32 |
| | | | | 310/52 |
| 7,088,021 | B2 * | 8/2006 | Kobayashi | H02K 9/19 |
| | | | | 310/261.1 |
| 7,834,492 | B2 * | 11/2010 | Iund | H02K 9/19 |
| | | | | 310/52 |
| 8,450,888 | B2 * | 5/2013 | Shafer | H02K 1/32 |
| | | | | 310/54 |
| 8,590,812 | B2 | 11/2013 | Wurz | |
| 9,239,063 | B2 | 1/2016 | Fenton et al. | |
| 9,523,277 | B2 * | 12/2016 | Dean | F01D 5/06 |
| 9,553,493 | B2 * | 1/2017 | Mogi | H02K 9/19 |
| 9,660,502 | B2 * | 5/2017 | Matsuki | H02K 9/193 |
| | | | | 285/13 |
| 9,917,490 | B2 * | 3/2018 | Lemmers | F01D 5/06 |
| 2002/0195887 | A1 * | 12/2002 | Kobayashi | H02K 9/19 |
| | | | | 310/61 |
| 2010/0264759 | A1 | 10/2010 | Shafer et al. | |
| 2014/0150437 | A1 | 6/2014 | Norrick et al. | |
| 2017/0107850 | A1 | 4/2017 | Scoffone et al. | |
| 2017/0314695 | A1 | 11/2017 | Hathaway et al. | |
| 2019/0006913 | A1 | 1/2019 | Steiger | |
| 2019/0113162 | A1 * | 4/2019 | Wermann | F16L 27/0828 |

FOREIGN PATENT DOCUMENTS

| | | |
|---|---|---|
| JP | 201591198 A | 5/2015 |
| WO | 2014125856 A1 | 8/2014 |

OTHER PUBLICATIONS

JP201591198A, Machine Translation.
WO2014125856A1, Bibliographic Data

* cited by examiner

ELECTRIC MACHINE WITH NON-CONTACT INTERFACE

BACKGROUND

Electric machines, such as generators, starters, turbine engines, and other motor assemblies include rotating and non-rotating parts. These motor assemblies typically include a housing in which rotating parts make up a rotor and non-rotating parts make up a stator. To keep rotating parts from overheating and breaking down, cooling fluid and lubricants are moved throughout fluid passages within the housing. Some of the fluid passages will pass between the non-rotating parts to the rotating parts. Transferring fluid between the rotating and non-rotating parts typically requires a complex sealing mechanism to prevent leaking from the fluid passages.

BRIEF DESCRIPTION

In one aspect, the disclosure herein relates to a generator for generating power comprising a housing, a non-rotating part within the housing and having a first fluid passage with a first inlet and a first outlet, a first converging nozzle fluidly coupled with the first fluid passage to increase the velocity of liquid passing through the first fluid passage, a rotating part within the housing and having a second fluid passage with a second inlet and a second outlet, and the second inlet is aligned with the first outlet, a diverging nozzle fluidly coupled with the second fluid passage to decrease the velocity of liquid passing through the second fluid passage, and a non-contact interface located between the first outlet and the second inlet defined at least in part where the non-rotating part is spaced from the rotating part to form at least one gap between the first outlet and the second inlet.

In another aspect, the disclosure herein relates to a rotary union comprising a non-rotating part having a first fluid passage with a first inlet and a first outlet, a first converging nozzle fluidly coupled with the first fluid passage to increase the velocity of liquid passing through the first fluid passage, a rotating part having a second fluid passage with a second inlet and a second outlet, and the second inlet is aligned with the first outlet, a diverging nozzle located in-line with the second fluid passage to decrease the velocity of liquid passing through the second fluid passage, and a non-contact interface located between the first outlet and the second inlet defined at least in part where the non-rotating part is spaced from the rotating part to form at least one gap between the first outlet and the second inlet.

In yet another aspect, the disclosure herein relates to a method of passing fluid between a first fluid passage located within a non-rotating part of an electric machine and a second fluid passage located within a rotating part of the electric machine the method comprising accelerating the fluid by changing at least one of a speed or a direction of the fluid, and passing the fluid across at least one gap defining at least a portion of a non-contact interface between the rotating part and the non-rotating part.

DETAILED DESCRIPTION OF THE EMBODIMENTS

The present disclosure is related to a rotary union within an electric machine between non-rotating and rotating components and the passage of fluid between flow passages within the non-rotating and rotating components. One non-limiting example of the electric machine is a generator/starter with rotating parts including a rotatable shaft and a rotor and non-rotating parts including a stator and passing fluid between fluid flow passages located within the non-rotating and rotating components across a non-contact interface defined at least in part by a gap between the rotor and the stator. While the examples described herein are directed to application of a gas turbine engine and a starter/generator, the disclosure can be applied to any implementation of an electric machine requiring fluid passage between rotating and non-rotating parts.

Figure 1:
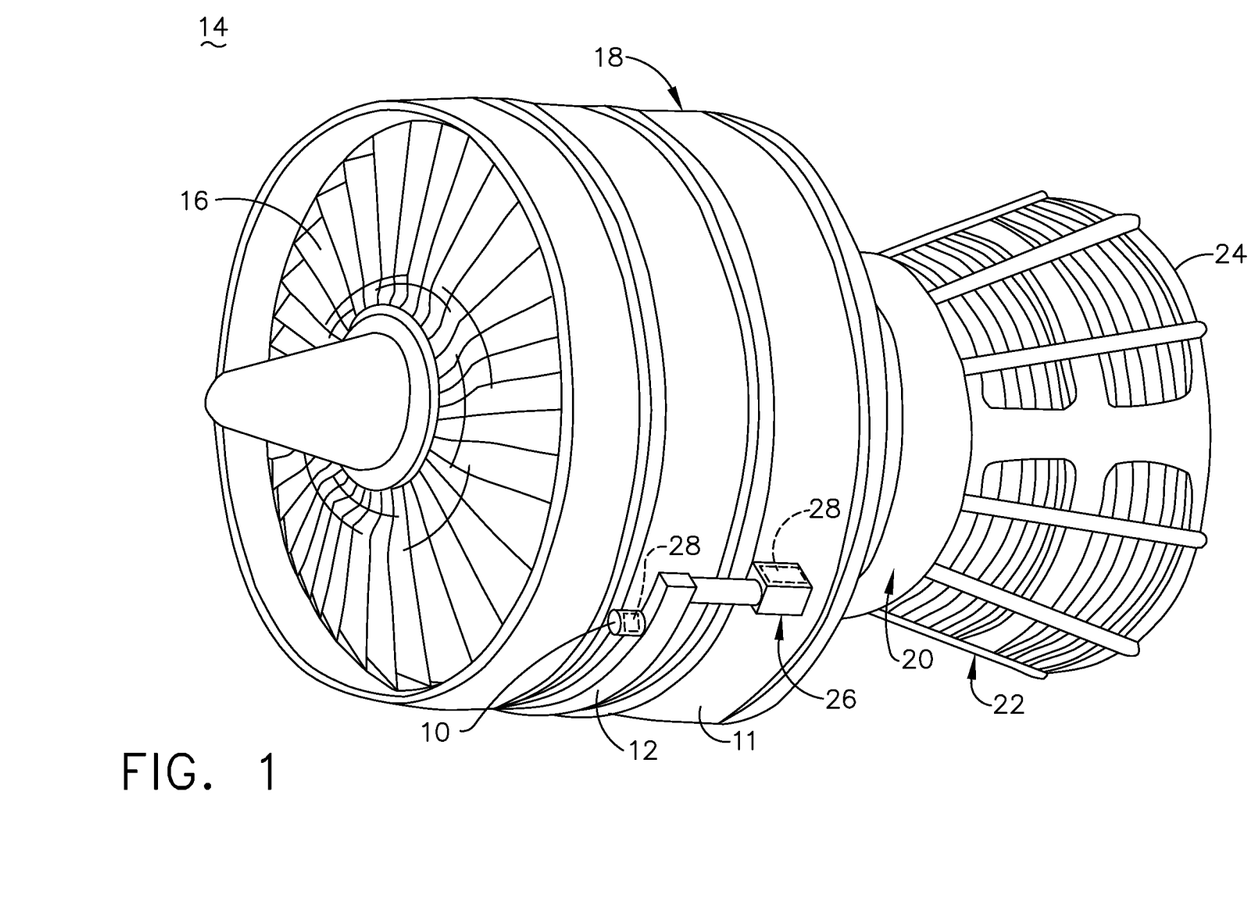
FIG. 1 is a schematic illustration of a gas turbine engine with an accessory gearbox and starter/generator.

Referring to FIG. 1, a starter/generator 10 is coupled to an accessory gear box (AGB) 12, also known as a transmission housing, and together are schematically illustrated as being mounted to a gas turbine engine 14. This assembly is commonly referred to as an Integrated Starter/Generator Gearbox (ISGB). The gas turbine engine 14 comprises an air intake with a fan 16 that supplies air to a high pressure compression region 18. The air intake with a fan 16 and the high pressure compression region collectively are known as the 'cold section' of the gas turbine engine upstream of the combustion. The high pressure compression region 18 provides a combustion chamber 20 with high pressure air. In the combustion chamber, the high pressure air is mixed with fuel and combusted. The hot and pressurized combusted gas passes through a high pressure turbine region 22 and a low pressure turbine region 24 before exhausting from the gas turbine engine. As the pressurized gases pass through the high pressure turbine (not shown) of the high pressure turbine region 22 and the low pressure turbine (not shown) of the low pressure turbine region 24, the turbines extract rotational energy from the flow of the gases passing through the gas turbine engine 14. The high pressure turbine of the high pressure turbine region 22 can be coupled to the compression mechanism (not shown) of the high pressure compression region 18 by way of a shaft to power the compression mechanism. The low pressure turbine can be coupled to the fan 16 of the air intake by way of a shaft to power the fan 16.

The gas turbine engine can be a turbofan engine, such as a General Electric GEnx or CF6 series engine, commonly used in modern commercial and military aviation or it could be a variety of other known gas turbine engines such as a turboprop or turboshaft. The gas turbine engine can also have an afterburner that burns an additional amount of fuel downstream of the low pressure turbine region 24 to increase the velocity of the exhausted gases, and thereby increasing thrust.

The AGB 12 is coupled to a turbine shaft of the gas turbine engine 14, either to the low pressure or high pressure turbine by way of a mechanical power take-off 26. The mechanical power take off 26 contains multiple gears and means for mechanical coupling of the AGB 12 to the gas turbine engine 14. The starter/generator 10 can be mounted on the outside of either the air intake region containing the fan 16 or on the core near the high pressure compression region 18.

Figure 2:
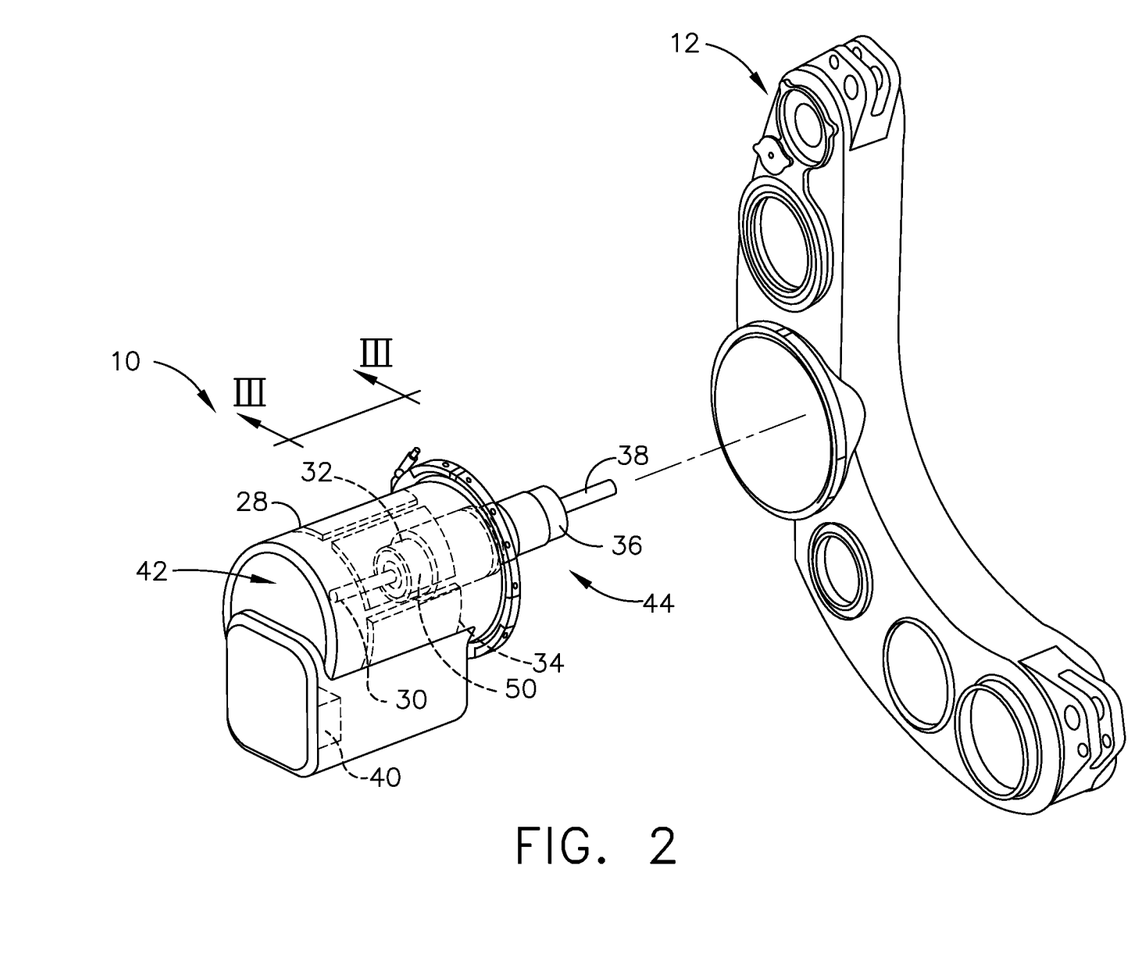
FIG. 2 is an enlarged perspective view of the accessory gear box and the starter/generator from FIG. 1.

Referring now to FIG. 2, the starter/generator 10 and AGB 12 are depicted in perspective view. The AGB 12 and the starter/generator 10 can be formed by any known materials and methods, including, but not limited to, die-casting of high strength and lightweight metals such as aluminum, stainless steel, iron, or titanium. The housings for the AGB 12 and starter/generator 10 can be formed with a thickness sufficient to provide adequate mechanical rigidity without adding unnecessary weight to AGB 12 and the starter/generator 10 and, therefore, the aircraft.

While illustrated as an electric generator the starter/generator 10 can be any electric machine know in the art. The starter/generator 10 can operate as a generator to provide power for accessories attached to the AGB 12 for example but not limited to a fuel pump, oil pump, or a separate engine starter. It is also contemplated that the starter/generator 10 can operate as a motor supplying mechanical output where necessary, for example but not limited to supplying mechanical output torque sufficient to start the engine.

A housing 28 of the starter/generator 10 encompasses a rotatable shaft 30 journaled within. A rotor 32 is mounted to the rotatable shaft 30 and a stator 34 is mounted to the housing 28. The rotor 32 is coupled to an output shaft 36. An input shaft 38 extends from within the output shaft 36 and is operably coupled to a portion of the AGB 12. A storage tank 40 is disposed within the housing 28 for holding a liquid coolant, by way of non-limiting example oil, used for cooling the various interior parts. For illustrative purposes, the housing 28 can be divided into a first and second portion 42, 44 such that the first portion 42 includes the storage tank 40 and parts of the rotatable shaft 30, rotor 32, and the stator 34 and the second portion 44 includes the output shaft 36, the input shaft 38 and the remaining parts of the rotatable shaft 30, rotor 32, and the stator 34.

The rotatable shaft 30 can be constructed by any known materials and methods, including, but not limited to extrusion or machining of high strength metal alloys such as those containing aluminum, iron, nickel, chromium, titanium, tungsten, vanadium, or molybdenum. The diameter of the rotor 32, output shaft 36, and input shaft 34 can be fixed or vary along the length of the rotatable shaft 30. A diameter of the rotatable shaft 30 along with rotor 32 to stator 34 spacing can vary to accommodate different size starter/generators.

As described herein, either the AGB 12 or the starter/generator 10 can be a driving mechanism for driving the rotation of the rotatable shaft 30. For example, during starting operations, the starter/generator 10 via the output shaft 36 can be the driving mechanism for rotation of the rotatable shaft 30. Alternatively, during normal gas turbine engine 14 operation, the AGB 12 can be the driving mechanism via the input shaft 34 for rotation of the rotatable shaft 30. The non-driving mechanism, that is, the equipment being driven by the driving mechanism, can be understood as rotating equipment utilizing the rotational movement of the rotatable shaft 30, for example to generate electricity in the starter/generator 10.

All directional references (e.g., radial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto can vary.

Figure 3:
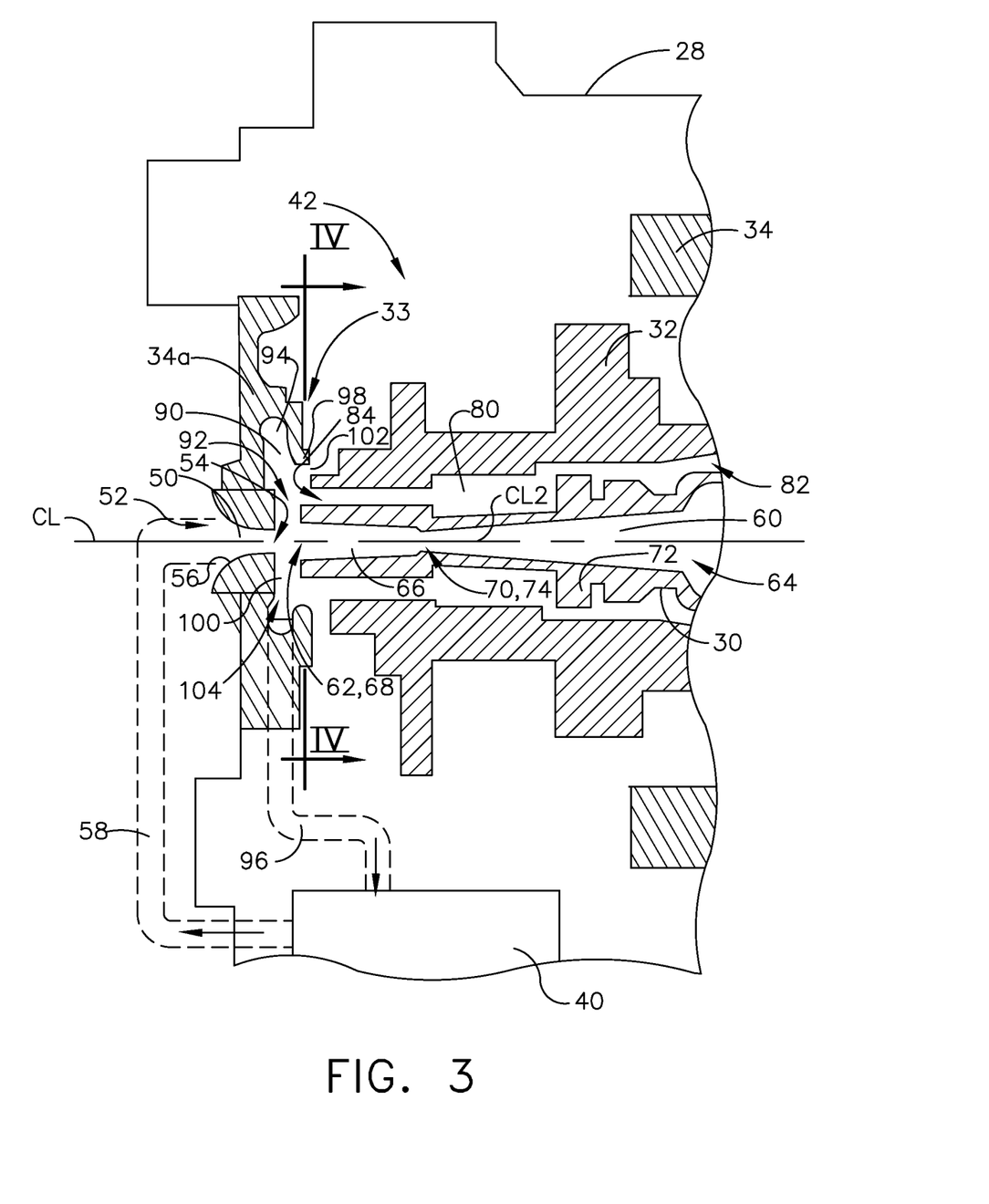
FIG. 3 is a cross-sectional view of a portion of the starter/generator of FIG. 2 having a stator and a rotor and including multiple fluid flow passages.

Turning to FIG. 3, a schematic cross-sectional view of the starter/generator 10 includes the first portion 42 of the housing 28 including a rotary union 33. For clarity, only the rotatable shaft 30, the rotor 32 and the stator 34 along with the storage tank 40 are illustrated. It should be understood that other components including, but not limited to, bearings, wires, fasteners, etc are included within the housing 28. A non-rotating part, by way of non-limiting example a portion of the stator 34 can define at least part of a back wall 34a of the housing 28. The back wall 34a can include a through hole defining a first fluid passage 50. The first fluid passage 50 can extend between a first inlet 52 and a first outlet 54. A first converging nozzle 56 can be disposed within the back wall 34a and can be fluidly coupled with the first fluid passage 50. The first fluid passage defines a first centerline (CL). It is further contemplated that the first converging nozzle 56 defines at least a portion of the first fluid passage 50. A first connecting conduit 58 fluidly connects the storage tank 40 to the first fluid passage 50. The first connecting conduit 58 can be located primarily within the housing 28 or have portions extending along the exterior of the housing 28.

The starter/generator 10 can include multiple rotating parts including the rotatable shaft 30 and the rotor 32. The rotor 32 can be mounted to and rotatable about the rotatable shaft 30. The rotatable shaft 30 and rotor 32 can be coaxial and rotatable about the same rotational axis 46. The rotatable shaft 30 can define a hollow interior 48 extending axially along a rotational axis to define at least a portion of a second fluid passage 60. The second fluid passage 60 can extend between a second inlet 62 and a second outlet 64. The second fluid passage 60 defines a second centerline (CL2) and the second inlet 62 can be in-line with the first outlet 54 wherein the first and second centerlines (CL, CL2) are coaxial at the first outlet 54 and the second inlet 62. A second converging nozzle 66 can be fluidly coupled with the second fluid passage 60. The second converging nozzle 66 can extend between a third inlet 68 and a third outlet 70 and define at least a portion of the second fluid passage 60. It is contemplated that the third inlet 68 has a cross-sectional area greater than the first outlet 54 and that the third inlet 68 defines the second inlet 62 of the second fluid passage 60.

A diverging nozzle 72 can be fluidly coupled with the second fluid passage 60 and downstream from the second converging nozzle 66. The diverging nozzle 72 can extend between a diverging inlet 74 and the second outlet 64. The diverging nozzle 72 can define at least a portion of the second fluid passage 60. Furthermore, the third outlet 70 can define the diverging inlet 74. The rotor 32 can be spaced from and circumscribe the rotatable shaft 30 to define a third fluid passage 80 extending between a fourth inlet 82 and a fourth outlet 84.

A fourth fluid passage, or an outlet fluid passage 90, can be located within the backwall 34a. The outlet fluid passage 90 can be radially spaced from the first fluid passage 50. The outlet fluid passage 90 can extend between a fifth inlet 92 and a fifth outlet 94, where the fifth inlet 92 is in-line with the fourth outlet 84 and the fifth outlet 94 is fluidly coupled to the storage tank 40 via a second connecting conduit 96. The fifth inlet 92 can be at least partially defined by a lip 98 extending axially from the backwall 34a and at least partially circumscribing the rotor 32. A fluid (C), by way of non-limiting example the liquid coolant from the storage tank 40 can pass into the first inlet 52 via the first connecting passage 58 and exit the outlet fluid passage 90 via the second connecting passage 96.

The rotatable shaft 30 can be spaced from the backwall 34a to define at least one gap, by way of non-limiting example an axial gap 100 or a radial gap 102 or both an axial gap 100 and a radial gap 102. The axial gap 100 can be formed between the first outlet 54 and the second inlet 62 to define at least a portion of a non-contact interface 104 between the rotating part, the rotatable shaft 30 and the non-rotating part, the backwall 34a. The lip 98 can be spaced from the rotor 32 to define the radial gap 102 between the fourth outlet 84 and the fifth inlet 92. The radial gap 102 defines another portion of the non-contact interface 104 where the rotor 32 is radially spaced from the backwall 34a.

Figure 4:
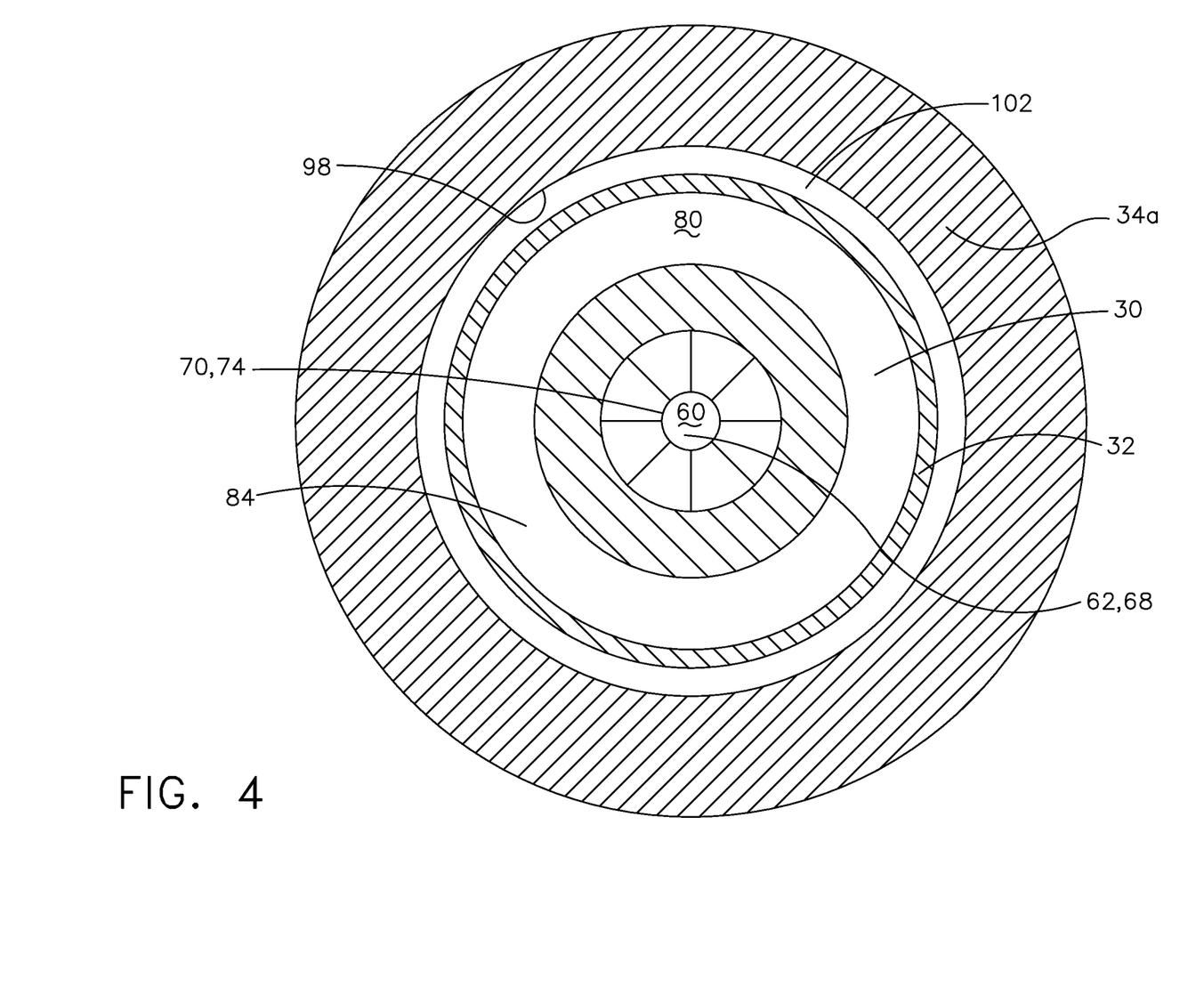
FIG. 4 is a cross-section taken along line IV-IV of FIG. 3 showing at least one inlet and outlet of the multiple fluid flow passages.

FIG. 4 is a cross-section taken along line IV-IV of FIG. 3 to more clearly illustrate the circumscribing relationship between the second fluid passage 60 and the third fluid passage 80. The radial gap 102, is also more clearly defined as being located between the rotor 32 and the stator 34, more specifically the lip 98 of the backwall 34a. Support struts and other structural details are not shown for clarity. It should be understood that the cross-section is for illustrative purposes only and not meant to be limiting.

Figure 5:
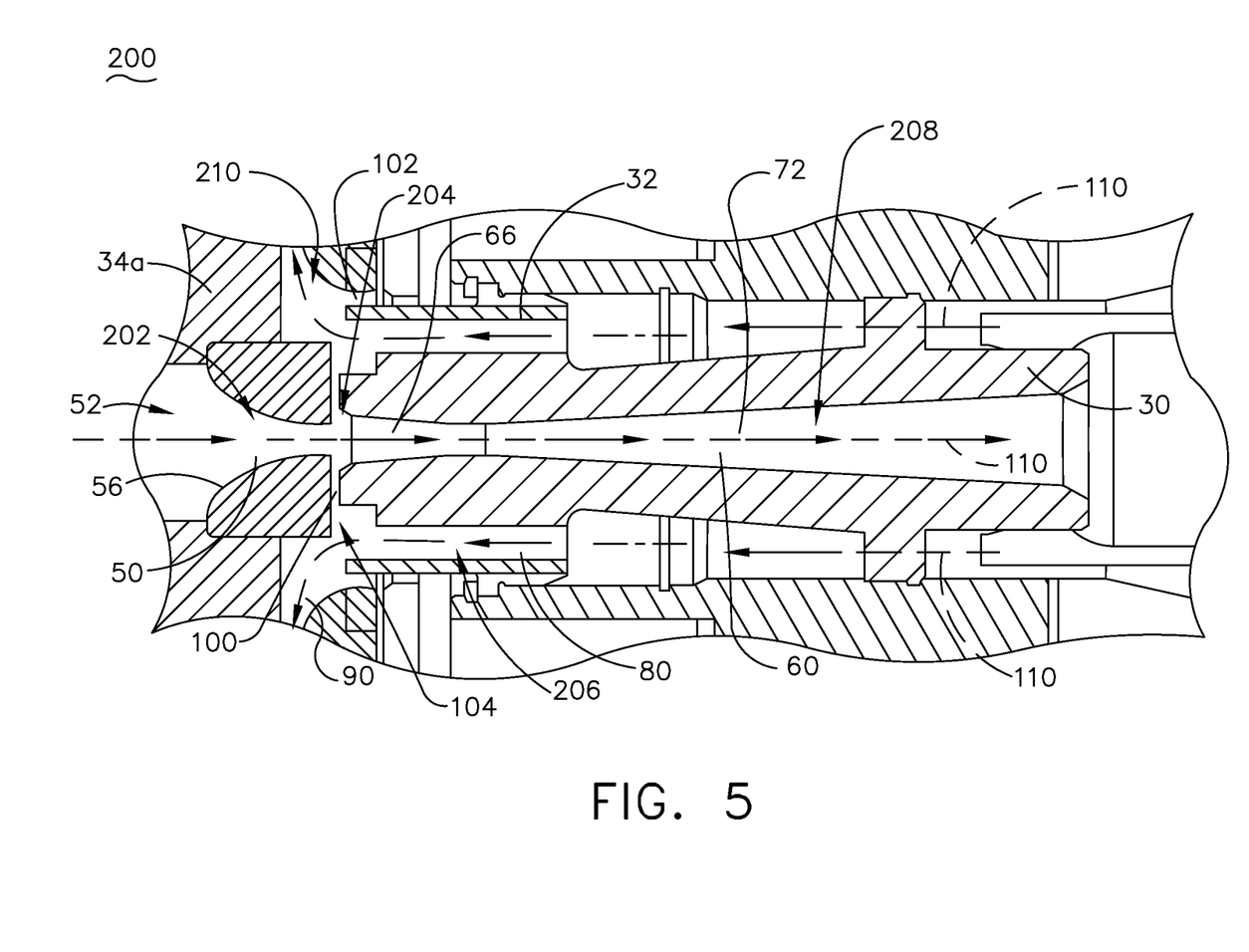
FIG. 5 is an enlarged cross-sectional view of the starter/generator of FIG. 3 including a non-contact interface and illustrating a method of passing fluid between two of the multiple fluid flow passages.

Turning to FIG. 5, an enlarged cross-section of the first, second, and third fluid passages is illustrated. A fluid flow path 110 through which the fluid (C) can pass is illustrated in dashed line. A method 200 of passing fluid between the first fluid passage 50 and the second fluid passage 60 includes at 202 accelerating the fluid by changing at least one of a speed or a direction of the fluid (C). At 204 the fluid is passed across at least one gap, by way of non-limiting example the axial gap 100 defining at least a portion of the non-contact interface 104 between the rotating part and the non-rotating part as described herein.

It should be understood that as described herein the term acceleration is a change in velocity. Velocity by definition includes both speed and direction, and therefore any acceleration can encompass an increase or a decrease in the speed of the fluid (C) in combination or separate from a change in direction of the fluid. Therefore acceleration can mean speeding up, slowing down, or changing direction, or any combination thereof.

It should be understood that the rotating parts can include, but are not limited to, the rotatable shaft 30 and the rotor 32. The non-rotating parts can include, but are not limited to, various portions of the stator 34 including the portion of the backwall 34a defining the first inlet 52 of the first fluid passage 50. The method 200 as described herein can encompass scenarios in which the first fluid passage is any fluid passage located within the non-rotating parts, by way of non-limiting example the first fluid passage 50 and the outlet fluid passage 90. The second fluid passage as referred to in the method 200 include any of the fluid passages located within the rotating parts, by way of non-limiting example the second fluid passage 60 and the third fluid passage 80.

At 202 the method 200 can include accelerating the fluid (C) through the first converging nozzle 56 to increase the speed of the fluid. The method 200 can further include at 206 accelerating the fluid (C) through the second converging nozzle 66. As the fluid (C) travels through the second fluid passage 60, the fluid (C) can be accelerated at 208 through the diverging nozzle 206 within the second fluid passage 60 located within the rotatable shaft 30 to decrease the speed of the fluid (C). As described herein, the converging nozzles are placed to increase the speed of the fluid (C), while the diverging nozzles are placed to decrease the speed of the fluid (C).

The fluid (C) can pass through various other fluid passages within the housing before entering the third fluid passage 80. In this scenario the method can include at 210 passing the fluid (C) from the third fluid passage 80 across the radial gap 102 to the outlet fluid passage 90. The non-contact interface 104 as described herein provides fluid distribution between a stationary fluid passage and a rotating fluid passage. Passing the fluid across the gaps 100, 102 as described herein can be achieved using one of, or a combination of, the following.

Figure 6:
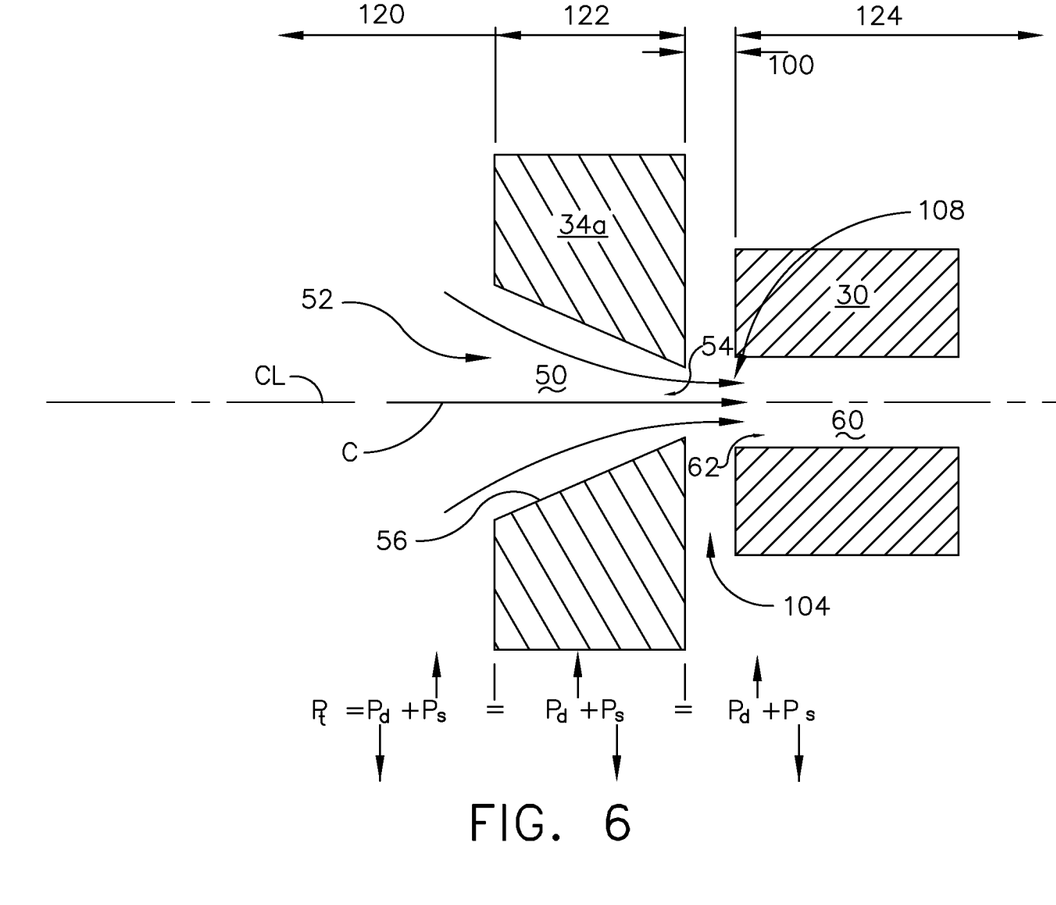
FIG. 6 is a schematic cross-sectional view of the non-contact interface between a first fluid flow passage and a second fluid flow passage according to an aspect of the disclosure herein.

Turning to FIG. 6, a schematic of the axial gap 100 defining at least a portion of the non-contact interface 104 as described herein is illustrated. In this scenario the converging nozzle 56 is formed to aim a jet of flow 108 into the second inlet 62 of the rotatable shaft 30. The schematic includes three main regions, region 120, region 122, and region 124. The stagnation pressure, or total pressure (Pt), remains constant along the streamline and therefore across all three regions. The total pressure (Pt) is equal to the sum of the static pressure (Ps) and the dynamic pressure (Pd), therefore the acceleration of the fluid (C) within the converging nozzle 56 can cause pressure variances between the static and dynamic pressure amounts (Ps, Pd) across these three regions.

Prior to entering the converging nozzle 56, the fluid (C) has a relatively lower magnitude of velocity creating a high static pressure (Ps)/low dynamic pressure (Pd) environment in region 120. As the fluid (C) is accelerated through the converging nozzle 56, the speed increases, causing an increase in the magnitude of velocity which creates a steadily decreasing static pressure (Ps)/increasing dynamic pressure (Pd) environment in region 122. Relative to region 120, region 124 is receiving a high magnitude of velocity fluid, and therefore is a region of low static pressure (Ps)/high dynamic pressure (Pd). Due to inertia the fluid (C) can pass over the axial gap 100 with minimal leaking through the gap. The method 200 as described herein can therefore include changing the static and dynamic pressure (Pd) within the first and second fluid passages.

Figure 7:
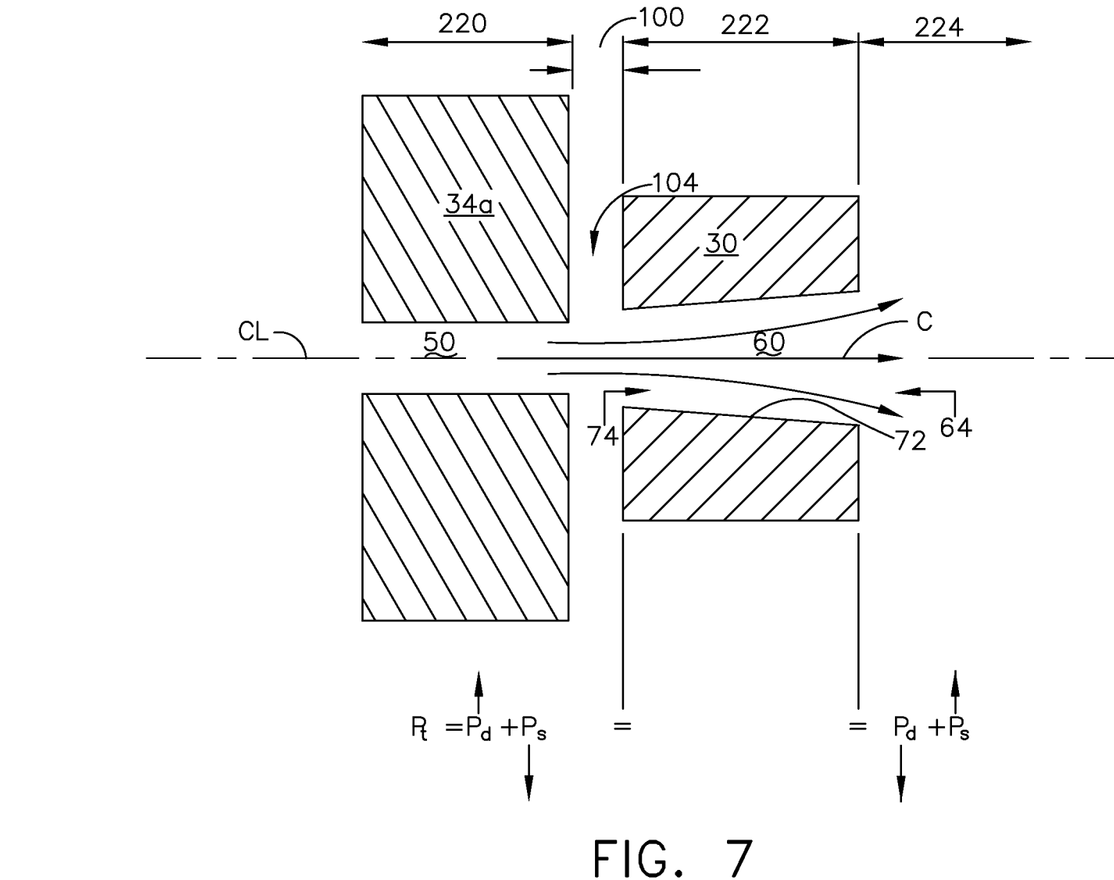
FIG. 7 is a schematic cross-sectional view of the non-contact interface between a first fluid flow passage and a second fluid flow passage according to an aspect of the disclosure herein.

Turning to FIG. 7, it is contemplated that the fluid (C) can pass through the first fluid passage 50 within a stationary part, for example the backwall 34a, across the axial gap 100 into the second fluid passage 60 including the diverging nozzle 72. In this scenario, the diverging nozzle 72 located in the rotating shaft 30 is utilized to recover dynamic head and convert back to static pressure (Ps). A first region 220 has a low static pressure (Ps)/high dynamic pressure (Pd) where the fluid (C) is moving at a relatively higher speed than in a second region 222. The second region 222 is defined by the diverging nozzle 72 and has an increasing static pressure (Ps)/decreasing dynamic pressure (Pd). As the fluid (C) slows down it can enter a third region 224 of high static pressure (Ps)/low dynamic pressure (Pd) after which the fluid (C) can be distributed throughout the housing 28. Again inertia of the fluid (C) causes minimal leaking through the gap.

Figure 8:
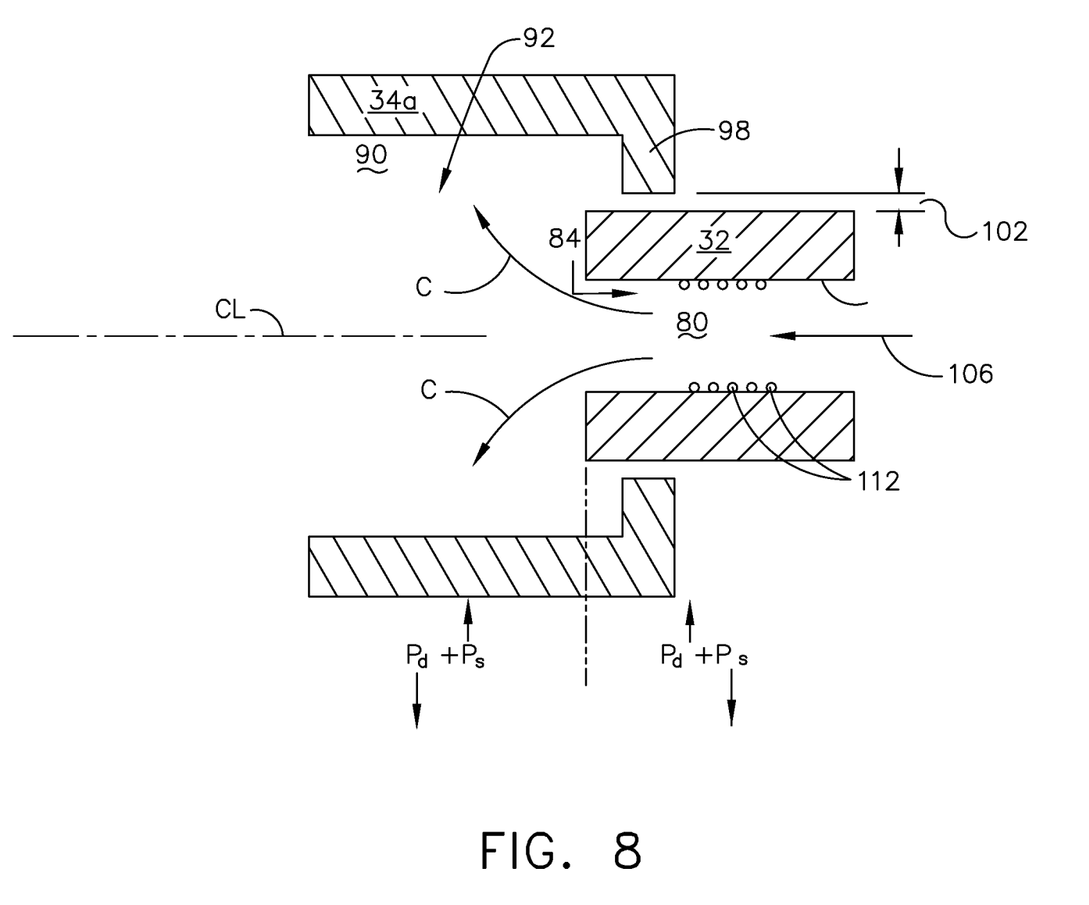
FIG. 8 is a schematic cross-sectional view of the non-contact interface between a third fluid flow passage and a fourth fluid flow passage according to an aspect of the disclosure herein.

In FIG. 8 a schematic of the portion of the backwall 34a with the lip 98 defining the radial gap 102 is illustrated. In this scenario, the rotor 32 is carrying an axial flow 106 into a stationary collection cavity, by way of non-limiting example the outlet fluid passage 90. The rotatable shaft 30 has been removed for clarity. The fluid (C) can collect 112 along an outer wall 114 due to centrifugal forces created from the rotating rotor 32. Upon exiting the fourth outlet 84, inertia propels the fluid (C) toward the fifth inlet 92 of the outlet fluid passage 90. The method 200 as described can further include changing the direction of the fluid (C) by rotating the third fluid passage 80, while the outlet fluid passage 90 remains stationary.

Multiple scenarios are described, all of which are non-contacting, thus avoiding preload and wear. Transferring fluid across a stationary to a rotating interface traditionally requires a complex sealing mechanism with a negative impact to function, reliability, cost, weight, and envelope.

Advantages to the solution presented include that a non-contacting interface provides a reliability improvement, by eliminating the wear interface of a seal. The disclosure as described can include a simple jet, diverging nozzle, or rotating shaft, all of which are small, light, and cost efficient.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new examples, whether or not the new examples are expressly described. Moreover, while "a set of" various elements have been described, it will be understood that "a set" can include any number of the respective elements, including only one element. Combinations or permutations of features described are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A generator for generating power comprising:
a housing;
a non-rotating part within the housing and having a first fluid passage with a first inlet and a first outlet;
a first converging nozzle fluidly coupled with the first fluid passage to increase the velocity of liquid passing through the first fluid passage;
a rotating part within the housing and having a second fluid passage with a second inlet and a second outlet, and the second inlet is aligned with the first outlet;
a diverging nozzle fluidly coupled with the second fluid passage to decrease the velocity of liquid passing through the second fluid passage;
a second converging nozzle upstream of the diverging nozzle and fluidly coupled with the second fluid passage; and
a non-contact interface located between the first outlet and the second inlet defined at least in part where the non-rotating part is spaced from the rotating part to form at least one gap between the first outlet and the second inlet;
wherein the second converging nozzle has a third inlet, which has a greater cross-sectional area than the first outlet.

2. The generator of claim 1 wherein the first fluid passage defines a first centerline and the second fluid passage defines a second centerline, wherein the first and second centerlines are coaxial at the first outlet and the second inlet.

3. The generator of claim 1 wherein the first converging nozzle defines the first outlet.

4. The generator of claim 1 wherein the third inlet defines the second inlet.

5. The generator of claim 1 wherein the gap includes at least one of an axial gap or a radial gap.

6. The generator of claim 5 wherein the gap includes both an axial gap and a radial gap.

7. The generator of claim 6 wherein the non-rotating part further comprises a lip spaced from the rotating part to define the radial gap.

8. The generator of claim 7 wherein the rotating part further comprises a third fluid passage having a fourth inlet and a fourth outlet.

9. The generator of claim 8 wherein the non-rotating part further defines an outlet fluid passage.

10. A rotary union comprising:
a non-rotating part having a first fluid passage with a first inlet and a first outlet;
a first converging nozzle fluidly coupled with the first fluid passage to increase the velocity of liquid passing through the first fluid passage;
a rotating part having a second fluid passage with a second inlet and a second outlet, and the second inlet is aligned with the first outlet;
comprising a second converging nozzle upstream of the first converging nozzle and fluidly coupled with the second fluid passage; and
a non-contact interface located between the first outlet and the second inlet defined at least in part where the non-rotating part is spaced from the rotating part to form at least one gap between the first outlet and the second inlet;
wherein the second converging nozzle has a third inlet, which has a greater cross-sectional area than the first outlet.

11. The rotary union of claim 10 wherein the first fluid passage defines a first centerline and the second fluid passage defines a second centerline, wherein the first and second centerlines are coaxial at the first outlet and the second inlet.

12. The rotary union of claim 10 wherein the gap includes at least one of an axial gap or a radial gap.

13. The rotary union of claim 12 wherein the non-rotating part further comprises a lip spaced from the rotating part to define the radial gap.

14. The rotary union of claim 13 wherein the rotating part further comprises a third fluid passage having a fourth inlet and a fourth outlet.

15. The rotary union of claim 14 wherein the non-rotating part further comprises an outlet fluid passage.

16. The rotary union of claim 10 further comprising a diverging nozzle located in-line with the second fluid passage to decrease the velocity of liquid passing through the second fluid passage.

17. The rotary union of claim 16 wherein the second converging nozzle is upstream of the diverging nozzle.

18. A method of passing fluid between a first fluid passage located within a non-rotating part of an electric machine and a second fluid passage located within a rotating part of the electric machine the method comprising:

accelerating the fluid by changing at least one of a speed or a direction of the fluid;

passing the fluid through a first converging nozzle defining at least a portion of the first fluid passage;

passing the fluid across at least one gap defining at least a portion of a non-contact interface between the rotating part and the non-rotating part; and passing the fluid through a second converging nozzle immediately downstream of the gap and defining at least a portion of the second fluid passage.

19. The method of claim 18 further comprising changing the static and dynamic pressure within the first fluid passage and the second fluid passage.

20. The method of claim 18 wherein passing the fluid through a first converging nozzle increases the speed of the fluid.

21. The method of claim 20 wherein passing the fluid through the second converging nozzle continuously increases the speed of the fluid.

22. The method of claim 18 further comprising passing the fluid through a diverging nozzle downstream of the second converging nozzle and further defining at least a portion of the second fluid passage.

23. The method of claim 22 wherein passing the fluid through the diverging nozzle decreases the speed of the fluid.

24. The method of claim 18 further comprising changing the direction of the fluid by rotating the second fluid passage while the first fluid passage remains stationary.

* * * * *

UNITED STATES PATENT AND TRADEMARK OFFICE
CERTIFICATE OF CORRECTION

PATENT NO. : 11,002,191 B2
APPLICATION NO. : 16/240245
DATED : May 11, 2021
INVENTOR(S) : Hathaway et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 140 days.

Signed and Sealed this
Fourteenth Day of February, 2023

*Katherine Kelly Vidal*
Katherine Kelly Vidal
*Director of the United States Patent and Trademark Office*